United States Patent
Liu

(10) Patent No.: US 12,244,216 B2
(45) Date of Patent: Mar. 4, 2025

(54) CIRCUITS AND METHOD FOR REDUCING LIGHT LOAD POWER DISSIPATION OF A VOLTAGE CONVERTER

(71) Applicant: Chengdu Monolithic Power Systems Co., Ltd., Chengdu (CN)

(72) Inventor: Pengfei Liu, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 230 days.

(21) Appl. No.: 17/886,110

(22) Filed: Aug. 11, 2022

(65) Prior Publication Data

US 2023/0058021 A1    Feb. 23, 2023

(30) Foreign Application Priority Data

Aug. 18, 2021   (CN) .......................... 202110950053.X

(51) Int. Cl.
*H02M 1/00* (2007.01)

(52) U.S. Cl.
CPC ....... *H02M 1/0032* (2021.05); *H02M 1/0025* (2021.05)

(58) Field of Classification Search
CPC .......................... H02M 1/0025; H02M 1/0032
See application file for complete search history.

(56) References Cited

U.S. PATENT DOCUMENTS

| | | | |
|---|---|---|---|
| 2004/0156219 A1* | 8/2004 | Chapuis ................ | H02M 3/157 363/89 |
| 2007/0063682 A1* | 3/2007 | Dagher ................ | H02M 3/156 323/282 |

\* cited by examiner

*Primary Examiner* — Peter M Novak
(74) *Attorney, Agent, or Firm* — Perkins Cole LLP

(57) ABSTRACT

A method for controlling a voltage converter includes the following steps. A feedback compensation signal is generated based on an output voltage of the voltage converter. An output representation signal is compared with a first threshold and a second threshold. A switch control signal to control the turn-on and turn-off of a power circuit of the voltage converter is adjusted based on an ultra-light load feedback value when the output representation signal is less than the first power threshold. The switch control signal is adjusted based on the feedback compensation signal when the output representation signal is greater than the first power threshold. The second threshold is greater than the first threshold, and the ultra-light load feedback value is greater than the feedback compensation signal when the output representation signal is equal to the second threshold.

20 Claims, 3 Drawing Sheets

CIRCUITS AND METHOD FOR REDUCING LIGHT LOAD POWER DISSIPATION OF A VOLTAGE CONVERTER

CROSS-REFERENCE TO RELATED APPLICATION(S)

The present application claims the benefit of and priority to a China Patent Application Serial No. 202110950053.X filed Aug. 18, 2021, which is hereby incorporated fully by reference into the present application.

FIELD

The present invention relates generally to electronic circuits, and more particularly but not exclusively to control circuit of voltage converter.

BACKGROUND

FIG. 1 illustrates a block diagram of a conventional voltage converter circuit 10, which includes a feedback circuit 101, an error amplifier circuit 102, a switch control circuit 103, and a power circuit 104. The feedback circuit 101 receives an output voltage Vout of the voltage converter 10, and generates a feedback voltage Vfb proportional to the output voltage Vout based on the output voltage Vout. The error amplifier circuit 102 compares the feedback voltage Vfb with the reference voltage Vref, and obtains a feedback compensation signal Vcomp. The feedback compensation signal Vcomp represents the deviation from the target output voltage to the actual output voltage. The switch control circuit 103 receives the feedback compensation signal Vcomp, and generates a switch control signal G1 to control turn-on and turn-off of the power switch of the power circuit 104 based on the feedback compensation signal Vcomp, and thus the output power Pout of the voltage converter 10 is adjusted accordingly.

FIG. 2 illustrates a schematic diagram of a relationship between the feedback compensation signal Vcomp and the output power Pout of the conventional voltage converter 10. The feedback compensation signal Vcomp typically reflects the output power Pout, that is, the larger the output power Pout is, the larger the feedback compensation signal Vcomp is. In some applications, in order to improve the efficiency of the voltage converter 10 under light load conditions, the voltage converter 10 determines the load condition according to the output power Pout, and operates in a burst mode under the light load.

SUMMARY

According to an embodiment of the present invention, a control circuit for a voltage converter includes a feedback compensation signal generating circuit, a hysteresis comparator circuit, a selection circuit, and a switch control. The feedback compensation signal generating circuit is configured to receive a feedback voltage and provide a feedback compensation signal based on the feedback voltage. The hysteresis comparator circuit is configured to receive an output representation signal, a first threshold, and a second threshold, and provide a selection signal based on the comparison of the output representation signal with the first threshold and the second threshold. The selection circuit is configured to receive the feedback compensation signal, an ultra-light load feedback value and the selection signal, and select one of the feedback compensation signal and the ultra-light load feedback value as a selected feedback compensation signal based on the selection signal. The switch control circuit is configured to receive the selected feedback compensation signal and provide a switch control signal based on the selected feedback compensation signal. The first threshold is greater than the first threshold, and, at the time the output representation signal is equal to the second threshold, the ultra-light load feedback value is greater than a value of the feedback compensation signal.

According to another embodiment of the present invention, a voltage converter includes a control circuit and a feedback circuit. The control circuit includes a feedback compensation signal generating circuit, a hysteresis comparator circuit, a selection circuit, and a switch control. The feedback compensation signal generating circuit is configured to receive a feedback voltage and provide a feedback compensation signal based on the feedback voltage. The hysteresis comparator circuit is configured to receive an output representation signal, a first threshold, and a second threshold, and provide a selection signal based on the comparison of the output representation signal with the first threshold and the second threshold. The selection circuit is configured to receive the feedback compensation signal, an ultra-light load feedback value and the selection signal, and select one of the feedback compensation signal and the ultra-light load feedback value as a selected feedback compensation signal based on the selection signal. The switch control circuit is configured to receive the selected feedback compensation signal and provide a switch control signal based on the selected feedback compensation signal. The first threshold is greater than the first threshold, and at the time the output representation signal is equal to the second threshold, the ultra-light load feedback value is greater than a value of the feedback compensation signal when the output representation signal is equal to the second threshold. The feedback circuit is configured to receive an output voltage of the voltage converter, and provide the feedback voltage based on the output voltage.

According to yet another embodiment of the present invention, a method for controlling a voltage converter includes the following steps. A feedback compensation signal is generated based on an output voltage of the voltage converter. An output representation signal is compared with a first threshold and a second threshold. A switch control signal to control the turn-on and turn-off of a power circuit of the voltage converter is adjusted based on an ultra-light load feedback value when the output representation signal is less than the first power threshold. The switch control signal is adjusted based on the feedback compensation signal when the output representation signal is greater than the first power threshold. The second threshold is greater than the first threshold, and at the time the output representation signal is equal to the second threshold, the ultra-light load feedback value is greater than the feedback compensation signal.

BRIEF DESCRIPTION OF THE DRAWINGS

The present invention can be further understood with reference to following detailed description and appended drawings, wherein like elements are provided with like reference numerals. These drawings are only for illustration purpose, thus may only show part of the devices and are not necessarily drawn to scale.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the phrases "in one embodiment", "in some embodiments", "in one implementation", and "in some implementations" as used includes both combinations and sub-combinations of various features described herein as well as variations and modifications thereof. These phrases used herein does not necessarily refer to the same embodiment, although it may. Those skilled in the art should understand that the meanings of the terms identified above do not necessarily limit the terms, but merely provide illustrative examples for the terms. It is noted that when an element is "connected to" or "coupled to" the other element, it means that the element is directly connected to or coupled to the other element, or indirectly connected to or coupled to the other element via another element. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
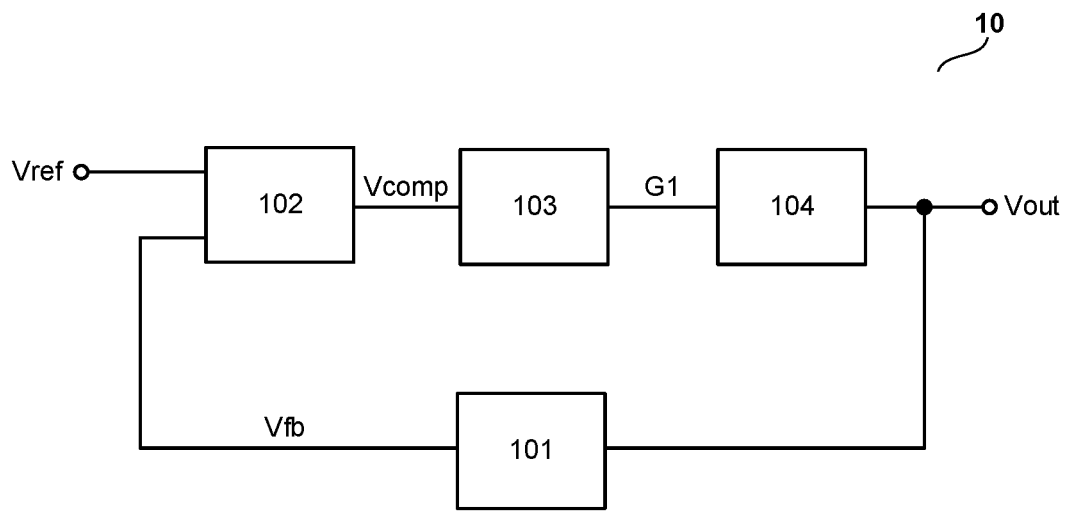
FIG. 1 illustrates a block diagram of a conventional voltage converter 10.
Figure 2:
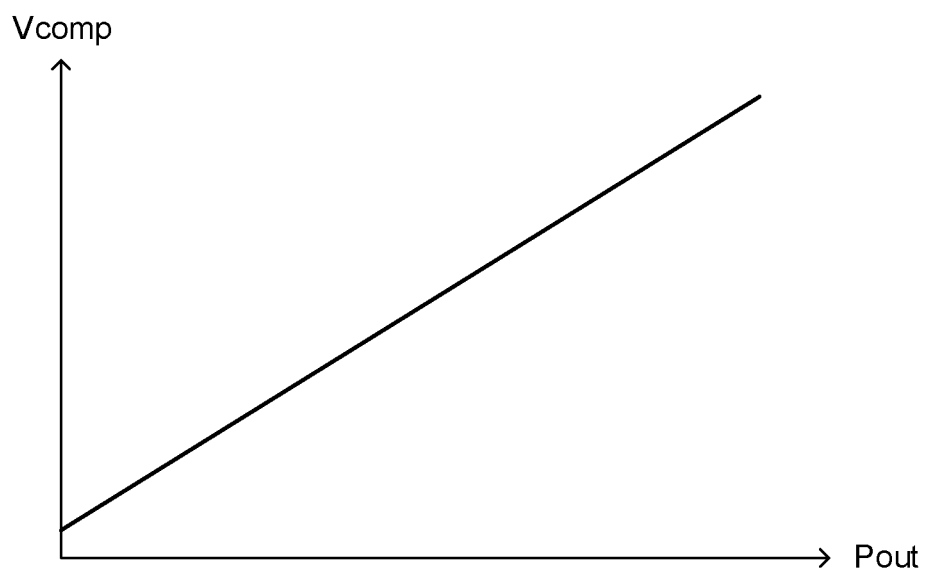
FIG. 2 illustrates a schematic diagram of relationship between the feedback compensation signal Vcomp and the output power Pout of the conventional voltage converter 10.
Figure 3:
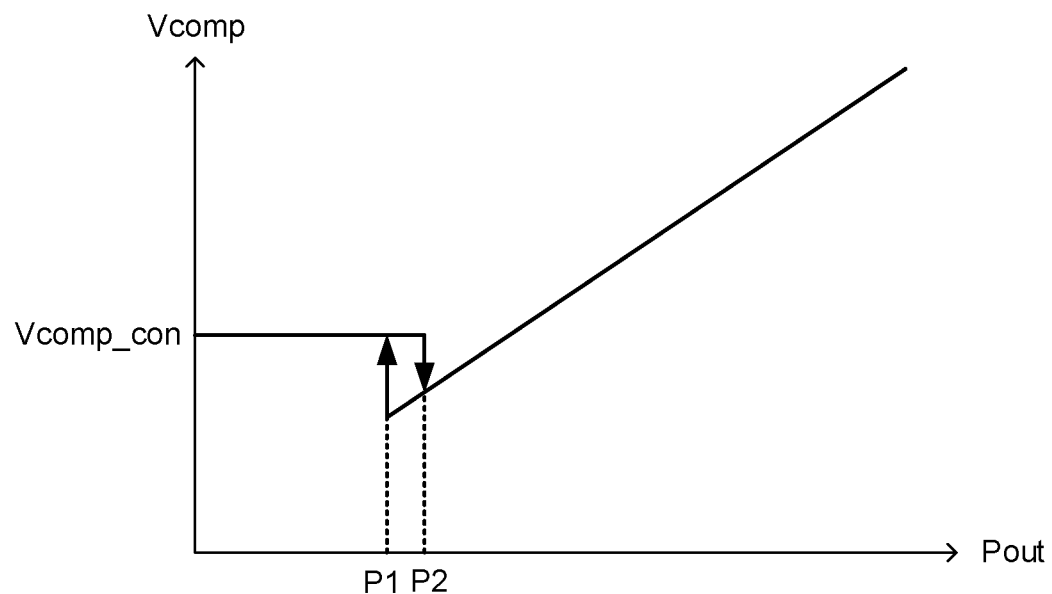
FIG. 3 illustrates a schematic diagram of relationship between the feedback compensation signal Vcomp and the output power Pout of the voltage converter in accordance with one embodiment of the present invention.

FIG. 3 illustrates a schematic diagram of a relationship between the feedback compensation signal Vcomp and the output power Pout of the voltage converter in accordance with one embodiment of the present invention. In one embodiment, when the output power Pout of the voltage converter decreases to a first power threshold P1, the voltage converter enters an ultra-light load mode, and a preset ultra-light load feedback value Vcomp_con instead of the feedback compensation signal Vcomp is provided to adjust the switch control signal G1. When the output power Pout of the voltage converter increases to a second power threshold P2, the voltage converter exits the ultra-light load mode, and the feedback compensation signal Vcomp representing the output power Pout is provided to adjust the switch control signal G1. In one embodiment, the first power threshold P1 is lower than the second power threshold P2.

In one embodiment, the ultra-light load mode is a burst mode. In the burst mode, the power circuit is continuously switched on and off during a burst-on period to provide the power to the load, while the power circuit is in an off-state during a burst-off period subsequent to the burst-on period. The burst-on period and the burst-off period define a burst period $T_{burst}$.

In one embodiment, the voltage converter operates in three modes, including a continuous switching mode, a pulse skipping mode and a burst mode. Under the continuous switching mode, the voltage converter continuously switches on and off of the power circuit according to the load conditions. Under the pulse skipping mode, after the voltage converter switches on and off for N consecutive times, the switching is blanked for a period of time (e.g., an idle time that the power circuit is turned off). The burst mode is similar to the pulse skipping mode. However, the idle time of the burst mode is longer. When the power circuit is turned on, it is able to substantially conduct current from the input of the voltage converter to the output of the voltage converter. Alternatively, when the power circuit is turned off, it blocks current and/or does not substantially conduct current from the input of the voltage converter to the output of the voltage converter.

In some embodiments, the voltage converter operates in two modes, i.e., a continuous switching mode and a burst mode. In some other embodiments, the voltage converter operates in two modes, i.e., a pulse skipping mode and a burst mode.

In one embodiment, the output power Pout of the voltage converter under the burst mode could be expressed as:

$$Pout = \frac{\sum_{i=1}^{N} Vcomp_i}{T_{burst}}, \qquad (1)$$

where $T_{burst}$ is a burst period of the voltage converter, i.e., the sum of burst-on period and burst-off period, N is the number of pulses of the burst-on period, i.e., the number of times of switching-on the power circuit during the burst period, and $Vcomp_i$ is the value of the feedback compensation signal Vcomp detected at each pulse under the burst mode.

In one embodiment, the output power Pout of the voltage converter under the continuous switching mode could be expressed as:

$$Pout = \frac{Vcomp}{T_{switch}}, \qquad (2)$$

where $T_{switch}$ is a switching period comprising an on period and an off period of the power circuit when the voltage converter operates in a continuous switching mode.

It should be noted that the operating mode of the voltage converter is selected according to applications. For example, the operating mode is determined according to the load conditions, i.e., the value of the output power Pout. The load conditions could be relatively determined by persons having ordinary skills in the art, and one or more thresholds to define the load conditions could be set according to practical applications. For instance, the values of the first power threshold P1 and the second power threshold P2 are set according to practical applications.

As shown in FIG. 3, when the output power Pout is lower than the first power threshold P1, the voltage converter enters a first operating mode, i.e., the burst mode. On the other hand, when the output power Pout is higher than the second power threshold P2, the voltage converter enters a second operating mode. In one embodiment, the second operating mode is the continuous switching mode. In another embodiment, the second operating mode is the pulse skipping mode.

In one embodiment, the ultra-light load feedback value Vcomp_con is a constant greater than the value of the feedback compensation signal Vcomp at the time the output power Pout is equal to the second power threshold P2. When the ultra-light load feedback value Vcomp_con is greater, the efficiency of the voltage converter is higher, and the ripple of the output voltage is also greater. On the other hand, when the efficiency of the voltage converter is lower, the ripple of the output voltage is also smaller. Therefore, the efficiency of the voltage converter under the ultra-light load mode could be improved by adjusting the value of the light load feedback value Vcomp_con of the voltage converter. In some embodiments, the ultra-light load feedback value Vcomp_con is a variable relative to the feedback voltage Vfb representing the output voltage Vout, and is greater than the feedback compensation signal Vcomp when the voltage converter operates in an ultra-light load. Specifically, at the time the output power Pout is equal to the second power threshold P2, the ultra-light load feedback value Vcomp_con is greater than the value of the feedback compensation signal Vcomp. For instance, the value of Vcomp_con is Vfb×A+B, where A and B is constant and set according to practical applications.

It should be well understood that the output power Pout of the voltage converter is the power provided to the load. In some embodiments, the output power Pout of the voltage converter is represented by the output power signal Po. Moreover, the output power signal Po could be represented by a voltage signal, a current signal or other signals representing the output power Pout. For instance, the output power signal Po may be obtained by calculated according to the equations (1) and (2). The value of the output power signal Po could be the same as the value of the equations (1) and (2), or proportional to the value of the equations (1) and (2). In another embodiment, the output power signal Po is obtained via digital circuits generated by hardware description language (e.g., Verilog, VHDL). The value of the first power threshold P1 and the second power threshold P2 may be set according to various forms of the output power signal Po. It should be well understood that the first power threshold P1 and the second power threshold P2 are set to distinguish the load conditions of the voltage converter to control the operating mode correspondingly.

Figure 4:
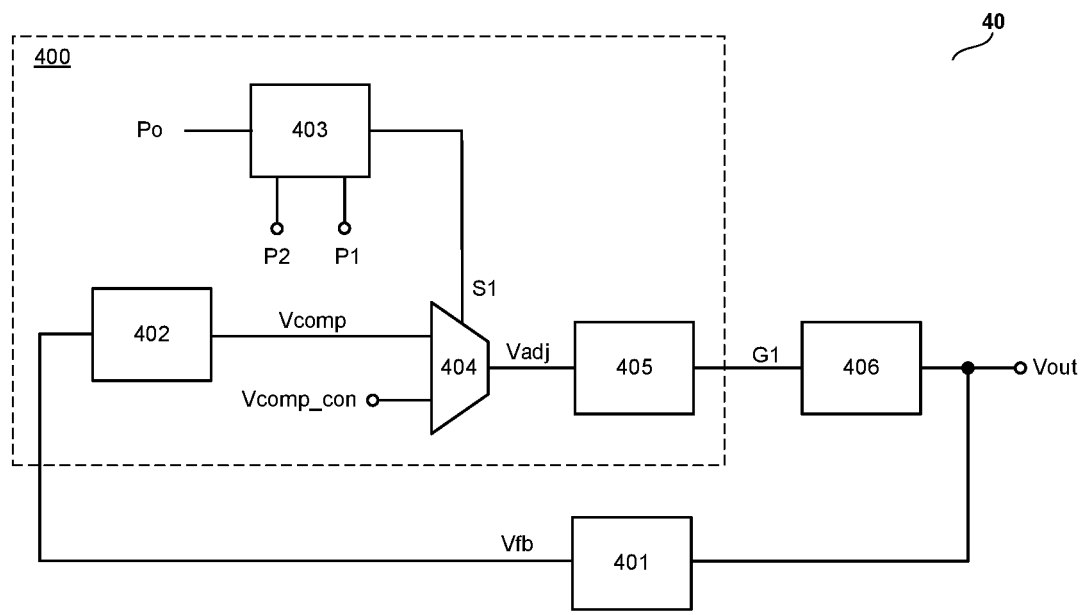
FIG. 4 illustrates a schematic diagram of a voltage converter 40 in accordance with one embodiment of the present invention.

FIG. 4 illustrates a schematic diagram of a voltage converter 40 in accordance with one embodiment of the present invention. As shown in FIG. 4, the voltage converter 40 includes a control circuit 400 and a power circuit 406. The control circuit 400 includes a feedback compensation signal generating circuit 402, a hysteresis comparator circuit 403, a selection circuit 404, and a switch control circuit 405. The feedback compensation signal generating circuit 402 is configured to receive a feedback voltage Vfb and provide a feedback compensation signal Vcomp based on the feedback voltage Vfb. The hysteresis comparator circuit 403 is configured to receive an output power signal Po, a first power threshold P1, and a second power threshold P2, and provide a selection signal S1 based on the comparison of the output power signal Po with the first power threshold P1 and the second power threshold P2. The selection circuit 404 is configured to receive the feedback compensation signal Vcomp, an ultra-light load feedback value Vcomp_con and the selection signal S1, and select one of the feedback compensation signal Vcomp and the ultra-light load feedback value Vcomp_con as a selected feedback compensation signal Vadj based on the selection signal S1. The switch control circuit 405 is configured to receive the selected feedback compensation signal Vadj and provide a switch control signal G1 based on the selected feedback compensation signal Vadj.

The power circuit 406 includes at least on power switch. The switch control signal G1 is configured to control the power switch of the power circuit 406. The power circuit 406 may include any topology of converter circuits such as Buck, Boost, Buck-Boost, and Flyback. Furthermore, the power circuit 406 may include a power driving circuit. Take a Buck converter for example, the switch control signal G1 is amplified by the power driving circuit to control the switching of the two switches of the Buck converter circuit. When the first power switch of the Buck converter circuit is turned on and the second power switch is turned off, the current from the input of the voltage converter is conducted to the output of the voltage converter via the first power switch, and thus the power circuit 406 is on-state. Alternatively, when the first power switch of the Buck converter circuit is turned off and the second power switch is turned on, the first power switch disconnect the current flowing from the input to the output, and thus the power circuit 406 is off-state.

In one embodiment, the voltage converter 40 further includes feedback circuit 401 configured to receive the output voltage Vout, and provide the feedback voltage Vfb based on the output voltage Vout. In one embodiment, the feedback circuit 401 includes a voltage divider to provide the feedback voltage Vfb proportional to the output voltage Vout. In some embodiments, the feedback circuit 401 includes a resistor-capacitor circuit. In some other embodiments, the feedback circuit 401 includes a voltage regulator (e.g., TL431). In one implementation, the feedback circuit 401 is integrated with the control circuit 400 on the same module or same chip. In another implementation, the feedback circuit 401 is separated from the control circuit 400.

In one embodiment, the feedback compensation signal generating circuit 402 includes an error amplifier. The error amplifier is configured to receive the feedback voltage Vfb and the reference voltage Vref (not shown), and amplifies the error between the feedback voltage Vfb and the reference voltage Vref to provide the feedback compensation signal Vcomp.

In some embodiments, the feedback compensation signal generating circuit 402 includes a computing circuit. In one embodiment, the feedback compensation signal Vcomp is linear to the feedback voltage Vfb, for example, Vcomp=K1×Vfb+K2, where K1, K2 are constants, and K1 is greater than 0. In another embodiment, the feedback compensation signal Vcomp could be expressed as: Vcomp=Vfb−K3, where K3 is a constant greater than 0. The value of K1, K2, and K3 may be set according to practical applications and system parameters. The feedback compensation signal generating circuit 402 is realized by traditional analog circuit, or it could be realized by digital circuits generated by hardware description language (e.g., Verilog, VHDL).

In one embodiment, the hysteresis comparator circuit 403 includes a hysteresis comparator configured to receive the output power signal Po, the first power threshold P1, and the second power threshold P2, and provide the selection signal S1. When the output power signal Po is less than the first power threshold P1, the selection signal S1 is a first voltage level indicating that the voltage converter 40 operates in a first operating mode; while when the output power signal Po is greater than the second power threshold P2, the selection signal S1 is a second voltage level indicating that the voltage converter 40 operates in a second operating mode. In one embodiment, the first voltage level is a high voltage level, and the second voltage level is a low voltage level. It should be well understood that the voltage level of the selection signal S1 is set according to practical applications. In some embodiments, a rising edge and a falling edge of a signal could be used to indicate different status of the selection signal S1. In one embodiment, the first power threshold P1 is less than the second power threshold P2.

In one embodiment, the selection circuit 404 includes a multiplexor configured to receive the feedback compensation signal Vcomp, the ultra-light load feedback value Vcomp_con and the selection signal S1. When the selection signal S1 indicates that the output power signal Po is less than the first power threshold P1, the selection circuit 404 selects the ultra-light load feedback value Vcomp_con as the selected feedback compensation signal Vadj and provides the selected signal to the switch control circuit 405. On the other hand, when the selection signal S1 indicates that the output power signal Po is greater than the second power threshold P2, the selection circuit 404 selects the feedback compensation signal Vcomp as the selected feedback compensation signal Vadj and provides the selected signal to the switch control circuit 405.

In one embodiment, the switch control circuit 405 includes any circuits generating the switch control signal G1 based on the feedback compensation signal Vcomp. For instance, the switch control circuit 405 may include a PWM (Pulse Width Modulation) control circuit, a PFM (Pulse Frequency Modulation) control circuit, and a PWM/PFM control circuit. The switch control circuit 405 may adopt any control schemes such as voltage control mode, peak current control mode, and average current control mode. Any switch control circuits may be used in the present invention to generate the switch control signal G1 based on the feedback compensation signal Vcomp.

Figure 5:
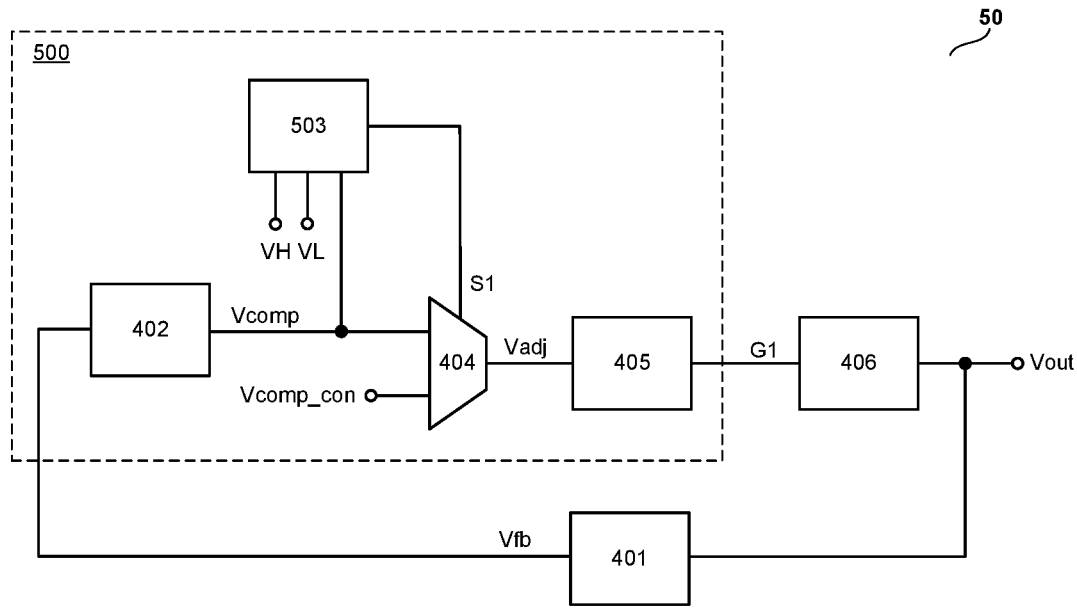
FIG. 5 illustrates a schematic diagram of a voltage converter 50 in accordance with one embodiment of the present invention.

FIG. 5 illustrates a schematic diagram of a voltage converter 50 in accordance with one embodiment of the present invention. As shown in FIG. 5, the voltage converter 50 includes a control circuit 500 and a power circuit 406. The control circuit 500 includes a feedback compensation signal generating circuit 402 a hysteresis comparator circuit 503, a selection circuit 404, and a switch control circuit 405. The feedback compensation signal generating circuit 402 is configured to receive a feedback voltage Vfb and provide a feedback compensation signal Vcomp based on the feedback voltage Vfb. The hysteresis comparator circuit 503 is configured to receive the feedback compensation signal Vcomp, a first feedback threshold VL, and a second feedback threshold VH, and provide the selection signal S1 based on comparison of the feedback compensation signal Vcomp with the first feedback threshold VL and the second feedback threshold VH. The selection circuit 404 is configured to receive the feedback compensation signal Vcomp, an ultra-light load feedback value Vcomp_con and the selection signal S1, and select one of the feedback compensation signal Vcomp and the ultra-light load feedback value Vcomp_con as a selected feedback compensation signal Vadj based on the selection signal S1. The switch control circuit 405 is configured to receive the selected feedback compensation signal Vadj and provide a switch control signal G1 based on the selected feedback compensation signal Vadj.

In one embodiment, the hysteresis comparator circuit 503 includes a hysteresis comparator configured to receive the feedback compensation signal Vcomp, the first feedback threshold VL, and the second feedback threshold VH, and provide the selection signal S1. When the feedback compensation signal Vcomp is less than the first feedback threshold VL, the selection signal S1 is a first voltage level indicating that the voltage converter 50 operates in a first operating mode; while when the feedback compensation signal Vcomp is greater than the second feedback threshold VH, the selection signal S1 is a second voltage level indicating that the voltage converter 40 operates in a second operating mode. In one embodiment, the first feedback threshold VL is less than the second feedback threshold VH.

In one embodiment as shown in FIG. 5, the feedback compensation signal Vcomp represents the output power Pout of the converter circuit. The first feedback threshold VL corresponds to the value of Vcomp when the output power Pout is equal to the first power threshold P1, and the second feedback threshold VH corresponds to the value of Vcomp at the time the output power Pout is equal to the second power threshold P2. It is noted that, in some other embodiments, the output power Pout may be represented by other signals or parameters of the voltage converter such as the load current, switching frequency, and the signals or parameters is used to generate the selection signal S1 for indicating the operating mode of the voltage converter.

Figure 6:
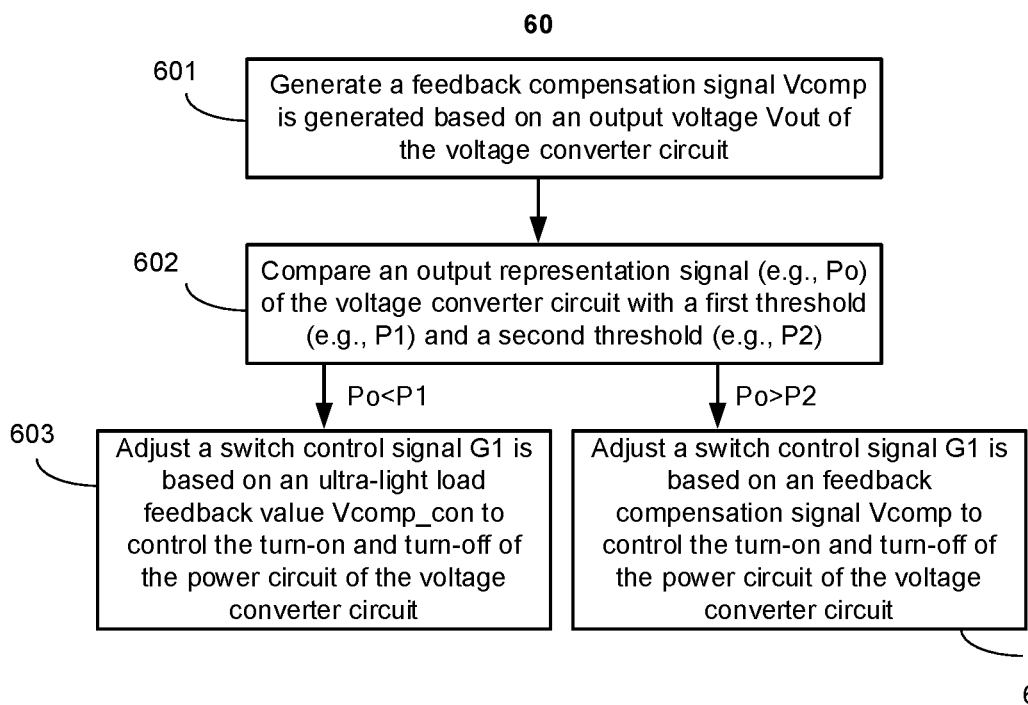
FIG. 6 illustrates a schematic flowchart of a method 60 for controlling a voltage converter in accordance with one embodiment of the present invention.

FIG. 6 illustrates a schematic flowchart of a method 60 for controlling a voltage converter in accordance with one embodiment of the present invention. The method 60 includes the following steps.

In step 601, a feedback compensation signal Vcomp is generated based on an output voltage Vout of the voltage converter.

In step 602, an output representation signal of the voltage converter is compared with a first threshold and a second threshold. When the output representation signal is less than the first threshold, step 603 is performed. When the output representation signal is greater than the second threshold, step 604 is performed.

In step 603, a switch control signal G1 is adjusted based on an ultra-light load feedback value Vcomp_con to control the turn-on and turn-off of the power circuit of the voltage converter.

In step 604, the switch control signal G1 is adjusted based on the feedback compensation signal Vcomp to control the turn-on and turn-off of the power circuit of the voltage converter.

In one embodiment, the output representation signal is an output power signal Po, the first threshold is a first power threshold P1, and the second threshold is a second power threshold P2. The second power threshold P2 is greater than the first power threshold P1, and the ultra-light load feedback value Vcomp_con is greater than the value of the feedback compensation signal Vcomp at the time the output power signal Po is equal to the first power threshold P1 and greater than the value of Vcomp at the time the output power signal Po is equal to the second power threshold P2.

In one embodiment, the ultra-light load feedback value Vcomp_con is a constant value.

In another embodiment, the ultra-light load feedback value Vcomp_con is linear to the feedback voltage Vfb representing the output voltage Vout of the voltage converter.

In one embodiment, the output representation signal is the feedback compensation signal Vcomp. In step 602, the feedback compensation signal Vcomp is compared with the first feedback threshold VL and the second feedback threshold VH, and step 603 is performed when the feedback compensation signal Vcomp is less than the first feedback threshold VL, while step 604 is performed when the feedback compensation signal Vcomp is greater than the second feedback threshold VH. The first feedback threshold VL corresponds to the value of Vcomp when the output power signal Po is equal to the first power threshold P1, and the second feedback threshold VH corresponds to the value of Vcomp at the time the output power Pout is equal to the second power threshold P2.

It will be appreciated by persons skilled in the art that the present invention is not limited to what has been particularly shown and described herein above. Rather the scope of the present invention is defined by the claims and includes both combinations and sub-combinations of the various features described hereinabove as well as variations and modifications thereof which would occur to persons skilled in the art upon reading the foregoing description and which are not in the prior art.

What is claimed is:

1. A control circuit for a voltage converter, comprising:
   a feedback compensation signal generating circuit configured to receive a feedback voltage and provide a feedback compensation signal based on the feedback voltage and a reference voltage;
   a hysteresis comparison circuit configured to receive an output representation signal, a first threshold, and a second threshold, and to provide a selection signal based on a comparison of the output representation signal with the first threshold and the second threshold;
   a selection circuit configured to receive the feedback compensation signal, an ultra-light load feedback value and the selection signal, and to select one of the feedback compensation signal and the ultra-light load feedback value as a selected feedback compensation signal based on the selection signal, wherein when the selection signal indicates the output representation signal is less than the first threshold, the ultra-light load feedback value is selected as the selected feedback compensation signal, when the selection signal indicates the output representation signal is greater than the second threshold, the feedback compensation signal is selected as the selected feedback compensation signal; and
   a switch control circuit configured to receive the selected feedback compensation signal and to provide a switch control signal based on the selected feedback compensation signal;
   wherein the second threshold is greater than the first threshold, and wherein, at the time the output representation signal is equal to the second threshold, the ultra-light load feedback value is greater than a value of the feedback compensation signal.

2. The control circuit of claim 1, wherein the output representation signal is an output power signal, the first threshold is a first power threshold, and the second threshold is a second power threshold.

3. The control circuit of claim 1, wherein the output representation signal is the feedback compensation signal, the first threshold is a first feedback threshold, and the second threshold is a second feedback threshold.

4. The control circuit of claim 1, wherein the feedback compensation signal generating circuit comprises an error amplifier.

5. The control circuit of claim 1, wherein the feedback compensation signal is linear to the feedback voltage representing an output voltage of the voltage converter.

6. The control circuit of claim 1, wherein the feedback compensation signal is greater than the feedback voltage representing an output voltage of the voltage converter.

7. The control circuit of claim 1, wherein the selection circuit comprises a multiplexor.

8. The control circuit of claim 1, wherein the ultra-light load feedback value is a constant.

9. The control circuit of claim 1, wherein the ultra-light load feedback value is linear to the feedback voltage representing an output voltage of the voltage converter.

10. A voltage converter, comprising:
    a feedback circuit configured to receive an output voltage of the voltage converter, and to provide a feedback voltage based on the output voltage; and
    a control circuit, comprising:
      a feedback compensation signal generating circuit configured to receive the feedback voltage and to provide a feedback compensation signal based on the feedback voltage and a reference voltage;
      a hysteresis comparison circuit configured to receive an output representation signal, a first threshold, and a second threshold, and to provide a selection signal based on a comparison of the output representation signal with the first and the second threshold;
      a selection circuit configured to receive the feedback compensation signal, an ultra-light load feedback value and the selection signal, and to select one of the feedback compensation signal and the ultra-light load feedback value as a selected feedback compensation signal based on the selection signal, wherein when the selection signal indicates the output representation signal is less than the first threshold, the ultra-light load feedback value is selected as the selected feedback compensation signal, when the selection signal indicates the output representation signal is greater than the second threshold, the feedback compensation signal is selected as the selected feedback compensation signal; and
      a switch control circuit configured to receive the selected feedback compensation signal and to provide a switch control signal based on the selected feedback compensation signal;
    wherein the second threshold is greater than the first threshold, and wherein, at the time the output representation signal is equal to the second threshold, the ultra-light load feedback value is greater than a value of the feedback compensation signal.

11. The voltage converter of claim 10, wherein the output representation signal is an output power signal, the first threshold is a first power threshold, and the second threshold is a second power threshold.

12. The voltage converter of claim 10, wherein the output representation signal is the feedback compensation signal, the first threshold is a first feedback threshold, and the second threshold is a second feedback threshold.

13. The voltage converter of claim 10, wherein the feedback compensation signal is linear to the feedback voltage representing an output voltage of the voltage converter.

14. The voltage converter of claim 10, wherein the feedback compensation signal is greater than the feedback voltage representing an output voltage of the voltage converter.

15. The voltage converter of claim 10, wherein the ultra-light load feedback value is a constant.

16. The voltage converter of claim 10, wherein the ultra-light load feedback value is linear to the feedback voltage representing an output voltage of the voltage converter.

17. The voltage converter of claim 10, further comprising a power circuit having at least one power switch.

18. A method for controlling a voltage converter, comprising:

generating a feedback compensation signal based on an output voltage of the voltage converter and a reference voltage;

comparing an output representation signal with a first threshold and a second threshold and providing a selection signal based on the comparison of the output representation signal with the first threshold and the second threshold;

selecting an ultra-light load feedback value as a selected feedback compensation signal when the selection signal indicates the output representation signal is less than the first threshold;

selecting the feedback compensation signal as the selected feedback compensation signal when the selection signal indicates the output representation signal is greater than the second threshold;

adjusting the switch control signal based on the selected feedback compensation signal; and wherein the second threshold is greater than the first threshold, and wherein, at the time the output representation signal is equal to the second threshold, the ultra-light load feedback value is greater than a value of the feedback compensation signal.

19. The method of claim 18, wherein the output representation signal is an output power signal, the first threshold is a first power threshold, and the second threshold is a second power threshold.

20. The method of claim 18, wherein the output representation signal is the feedback compensation signal, the first threshold is a first feedback threshold, and the second threshold is a second feedback threshold.

* * * * *